United States Patent
Perroni et al.

(10) Patent No.: US 7,519,751 B2
(45) Date of Patent: Apr. 14, 2009

(54) METHOD OF GENERATING AN ENABLE SIGNAL OF A STANDARD MEMORY CORE AND RELATIVE MEMORY DEVICE

(76) Inventors: Maurizio Francesco Perroni, Via Roma, 18, 98054 Furnari (IT); Salvatore Polizzi, Via Notarbartolo, 31, 90100 Palermo (IT); Andrea Scavuzzo, Via Autonomia Siciliana, 109, 90100 Palermo (IT)

( * ) Notice: Subject to any disclaimer, the term of this patent is extended or adjusted under 35 U.S.C. 154(b) by 537 days.

(21) Appl. No.: 10/886,003

(22) Filed: Jul. 7, 2004

(65) Prior Publication Data

US 2005/0030801 A1 Feb. 10, 2005

(30) Foreign Application Priority Data

Jul. 7, 2003 (IT) .......................... VA2003A0022

(51) Int. Cl.
*G06F 13/00* (2006.01)
(52) U.S. Cl. ..................... 710/107; 710/305; 710/306; 710/315; 365/189.011; 365/219
(58) Field of Classification Search ................. 710/104, 710/105, 107, 305, 306, 315; 365/189.01, 365/219
See application file for complete search history.

(56) References Cited

U.S. PATENT DOCUMENTS

| 5,966,723 | A | 10/1999 | James et al. | 711/103 |
|---|---|---|---|---|
| 5,991,841 | A | 11/1999 | Gafken et al. | 710/104 |
| 6,894,914 | B2 * | 5/2005 | Perroni et al. | 365/63 |
| 7,151,705 | B2 * | 12/2006 | Polizzi et al. | 365/201 |
| 2003/0088729 | A1 | 5/2003 | Polizzi et al. | 711/103 |
| 2003/0090939 | A1 | 5/2003 | Perroni et al. | 365/185.09 |
| 2004/0071028 | A1 * | 4/2004 | Messina et al. | 365/202 |
| 2004/0085822 | A1 * | 5/2004 | DeCaro | 365/200 |

\* cited by examiner

*Primary Examiner*—Glenn A Auve
(74) *Attorney, Agent, or Firm*—Schwabe, Williamson & Wyatt, P.C.

(57) ABSTRACT

A memory device is configured for communicating with one of two different serial protocols, respectively an LPC or an SPI protocol, as well as with a parallel communication protocol through a multi-protocol interface while requiring only a single additional pin as compared to a standard memory device accessible with a parallel communication protocol. This result is achieved by exploiting the same pin for providing a timing signal for serial mode communications or an address multiplexing signal for parallel mode communications. The additional pin is used for conveying a start signal of an A/AMUX parallel communication protocol. The interface includes logic circuits that generate an enable signal for the standard memory core of the memory device.

16 Claims, 6 Drawing Sheets

US 7,519,751 B2

METHOD OF GENERATING AN ENABLE SIGNAL OF A STANDARD MEMORY CORE AND RELATIVE MEMORY DEVICE

FIELD OF THE INVENTION

The present invention relates in general to memory devices, and more particularly, to a memory device that supports different communication protocols by recognizing the protocol of the coded data.

BACKGROUND OF THE INVENTION

Volatile and non-volatile memory devices have a number of applications, such as in digital cameras and measuring instruments, for example. A functional block diagram of a common memory device supporting the serial communication protocol known as the Firmware Hub protocol, and another commonly used serial communication protocol known as the low pin count type (LPC) is shown in FIG. 1.

These serial communication protocols may be supported by the same device because the protocols require compatible characteristics. That is, they may be alternately used in memory devices having the same arrangement and number of I/O pins (4). This may include, in particular, a dedicated pin for the provision of an externally generated timing signal CK_PAD, and a dedicated pin for the provision of the start signal of the preamble LFRAME.

Typically these memory devices include a standard flash memory core having a serial communication interface LPC/FWH INTERFACE coupled to four I/O pins LPC_PAD<3:0> for transferring data and addresses to a dedicated pin for receiving a clock signal CK_PAD, and to another dedicated pin LFRAME for receiving a start signal of a cycle of the communication protocol. The interface generates the internal commands Chip Enable (CE) and Write Enable (WE), respectively, to enable the standard memory core and to permit writing operations in the memory array.

The device receives through the pins connected to the external bus LPC/FWH BUS the commands relative to the various cycles of the communication protocol, addresses and data. The data received through LPC_PAD<3:0> are arranged in a parallel mode by the interface for conveying them to the standard memory core FLASH CORE through the internal address bus ADDR<20:0> and the internal data bus DBUS<15:0>.

A configuring circuit CAM SETTING generates a logic signal CAM that configures the memory device for either the Firmware Hub communication protocol or for a different LPC protocol. During a test-on-wafer or EWS phase of the fabrication process of the device, the CAM SETTING circuit is permanently configured to make the fabricated memory device capable of functioning with a Firmware Hub protocol or with a different LPC protocol. This is based on the customer's specification.

Typically, the CAM SETTING circuit contains a non-volatile memory cell, for example a FLASH EPROM, that stores a CAM bit that specifies the type of serial communication protocol that is enabled. This way of fabricating memory devices is convenient for the manufacturer because it permits the same memory device to be fabricated, which is eventually configured based upon the customer's preference during a final step of the fabrication process for the selected serial communication protocol of the two possible alternatives.

FIG. 2 shows an input buffer of the memory device of FIG. 1. An internal signal INTERNAL_SIGNAL is produced as replica of an input signal available on any one of the input pins (INPUT_PIN) only if the inverted replica CE_N of the Chip Enable signal assumes the low logic state. When the signal CE_N assumes the high logic state, the node on which the INTERNAL_SIGNAL is produced is grounded (GND).

FIG. 3 shows a typical output buffer of the memory device of FIG. 1. The output buffer is substantially a pull-up_pull-down stage driven by a logic signal EN and by its inverted replica EN_N, to be replicated on an output pin of the device (OUTPUT_PIN).

FIG. 4 shows the sequence of cycles for performing a read operation according to a Firmware Hub protocol, which includes the following cycles. A Start_Code preamble signals the start of a protocol cycle and specifies whether a write operation or a read operation is requested. An Idsel_Code cycle identifies the memory device called to transfer data with the external system host. Seven Add_Code cycles communicate the address of the memory location in which the external host is to perform either a read or write operation. A Msize cycle specifies the number of bytes that is to be read, and two Tar_Code cycles by which the external host gives control of the system bus to the memory device.

After these last two cycles, the standard FLASH CORE memory engages the system bus. Thereafter, the FLASH CORE generates wait cycles Sync_Code, during which it performs internal operations. Once the reading of data has been completed, the FLASH CORE delivers the read data through the cycles Data_L and Data_H, and thereafter, by two more Tar_Code cycles, the FLASH CORE relinquishes control of the system bus to the external host.

As mentioned above, this type of memory device is permanently configured at the end of the fabricating process to utilize only a selected serial communication protocol, for example a Firmware Hub protocol or a different LPC protocol. In general, so-called LPC protocols distinguish among themselves by the sequence of cycles through which the standard memory core is accessed. These protocols have in common the fact of using a start signal supplied to the device through a dedicated pin LFRAME, and the fact that the communication of data or commands is timed by a clock signal supplied to the device through a dedicated pin CK_PAD.

On the other hand, another serial mode access protocol that is frequently utilized is the so-called SPI protocol. This protocol requires a clock pin CK_PAD, a selection pin SELECT, an input pin and an output pin. A sample sequence of the cycles of an SPI protocol is depicted in FIG. 5. The leading high-to-low transition edge of the SELECT signal starts the SPI communication protocol. During the first eight clock cycles instructions on the operations to be carried out are received and the interface recognizes whether a read or a write operation is requested. In the successive twenty-four clock cycles, addresses of the memory location to be accessed are communicated.

Thereafter, data are transmitted in n clock cycles. Finally, the trailing edge (low-to-high transition) of the SELECT signal indicates that the read or write operation is complete. Moreover, often the user must preliminary program the standard memory core of the device. In view of the fact that such a preliminary program operation implies the writing of a large quantity of data, it is more convenient to access the memory device in a parallel mode rather than in a serial mode.

For this reason memory devices have been developed to be capable of selectively functioning with a serial or with a parallel communication protocol. Normally, these devices have a dedicated pin for receiving a selection signal IC for a parallel mode of operation. When the selection signal IC is inactive, the memory devices function in a serial mode, communicating according to a SPI protocol. Otherwise, the memory devices function according to a parallel communication protocol.

Such an optionally selectable parallel communication protocol may be supported by memory devices that have at least 11 address pins, 8 I/O data pins and which use a control signal for multiplexing the addresses when functioning in a parallel access mode. The parallel functioning is automatically selected by the IC signal, and when it is active, the standard memory core is automatically enabled. Data are read from the memory by column and by rows, depending on the logic value of an address multiplexing signal RC, as depicted in FIG. 6.

A parallel communication protocol having such characteristics may be defined as an A/AMUX protocol (shortly for address/address multiplexer). Because of the different requirements of specific serial communication protocols and of parallel communication protocols, it has not been possible so far to form memory devices that could be configured at fabrication level for supporting a Firmware Hub serial communication protocol or a different LPC serial communication protocol besides an SPI serial communication protocol and a parallel communication protocol of the type A/AMUX, without significantly increasing the number of pins. However, an increase in the number of pins is often unacceptable or costly.

SUMMARY OF THE INVENTION

An object of the present invention is to provide a memory device that may be configured for communicating with either a predetermined LPC serial protocol or with a serial SPI protocol, in addition to a parallel communication protocol A/AMUX, through a multiprotocol interface, and the memory is to require only one additional pin as compared to a memory device capable of being accessed with a parallel A/AMUX parallel communication protocol.

According to the invention, the same pin is exploited for either conveying a timing signal for communicating in a serial mode or an address multiplexing signal for communicating in a parallel mode. The single pin is for conveying a start signal of an A/AMUX parallel communication protocol, and is included within the interface logic circuits that generate the enable signal of the standard memory core of the device.

A further object of the invention is to provide a method for generating an enabling signal of a memory device selectively accessible with an LPC or a SPI serial communication protocol or with a parallel communication protocol A/AMUX.

The memory device comprises a standard memory core, and a multi-protocol interface receiving a synchronization signal and a start signal of a serial communication protocol. An enabling signal of the standard memory core is generated and conveyed to the standard memory core data and/or addresses. The memory device comprises a decoding circuit of two different serial protocols and of a parallel A/AMUX protocol, coupled to the external data bus and to the external address bus. The decoding circuit receives at an input a logic signal for configuration and exchanges with the standard memory core data and addresses through internal buses of the device. A configuring circuit generates the logic signal for configuration supplied to the multi-protocol interface, and chooses between two different serial communication protocols.

According to the method of the invention, the enabling signal (Chip Enable) is generated as the logic combination of a select signal of a parallel mode of access provided to the multi-protocol interface, of the logic configuration signal, of the start signal and of the four least significant bits of the external data bus.

BRIEF DESCRIPTION OF THE DRAWINGS

The different aspects and advantages of this invention will become even more evident through the following detailed description of an embodiment and by referring to the attached drawings, wherein.

DETAILED DESCRIPTION OF THE PREFERRED EMBODIMENTS

Figure 7:
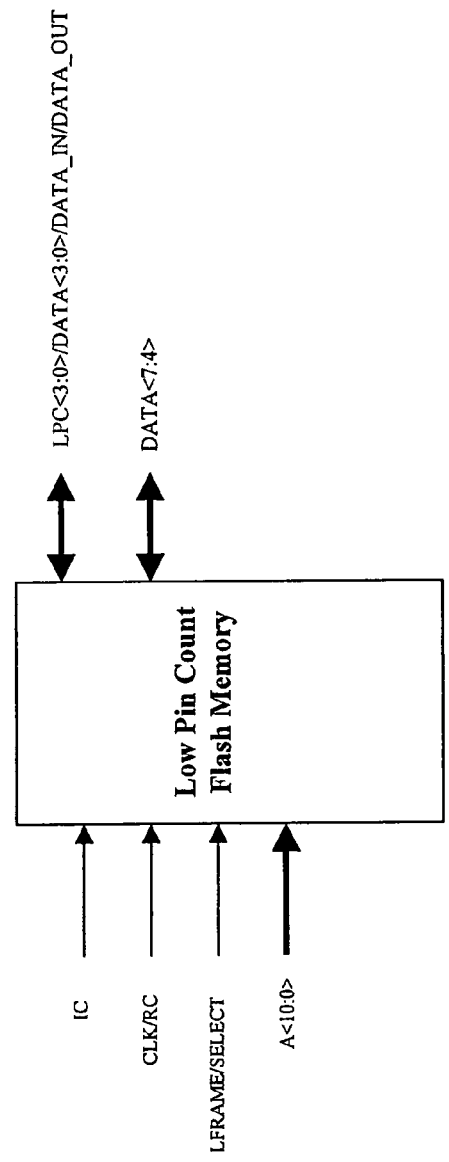
FIG. 7 is a basic diagram of a memory device according to the present invention.

The memory device of the invention, depicted in FIG. 7, supports serial communication protocols LPC and SPI and a parallel communication protocol. The device contains a multi-protocol interface capable of communicating by using anyone of the supported protocols, and requires only an additional pin (LFRAME/SELECT) compared to a standard memory device accessed in parallel mode. This is achieved by exploiting the same pins for providing signals of different objects to the memory device depending on the communication protocol being used.

In the embodiment shown, the device of FIG. 7 is interfaced with an external data bus DATA<7:0>, and to an external address bus A<10:0> and has a first pin on which it receives an externally generated timing signal CLK (necessary for serial mode communications) or an address multiplexing signal RC (for parallel mode communications), a second pin on which it receives a start signal LFRAME/SELECT for either a serial communication protocol (LFRAME) or for a parallel communication protocol (SELECT), and a third pin on which it receives a selection signal IC for communication in a parallel mode.

When the signal IC is active, the signal RC is provided on the first pin, data and memory addresses are conveyed on the buses DATA <7:0> and A<10:0> and the second pin LFRAME/SELECT remains unused. Conversely, when the signal IC is not active and therefore the memory core is being accessed with a serial communication protocol, on the same first pin is provided the timing signal CLK, the external address bus A<10:0> remains unused, and only the four least significative bits LPG<3:0>/DATA <3:0> of the external data bus are used.

A problem that has been successfully overcome to form the memory device accessible with different protocols while requiring the minimum number of additional pins (only one additional pin), is the generation of the enable signal CE (Chip Enable) for the standard memory core FLASH CORE.

Figure 8:
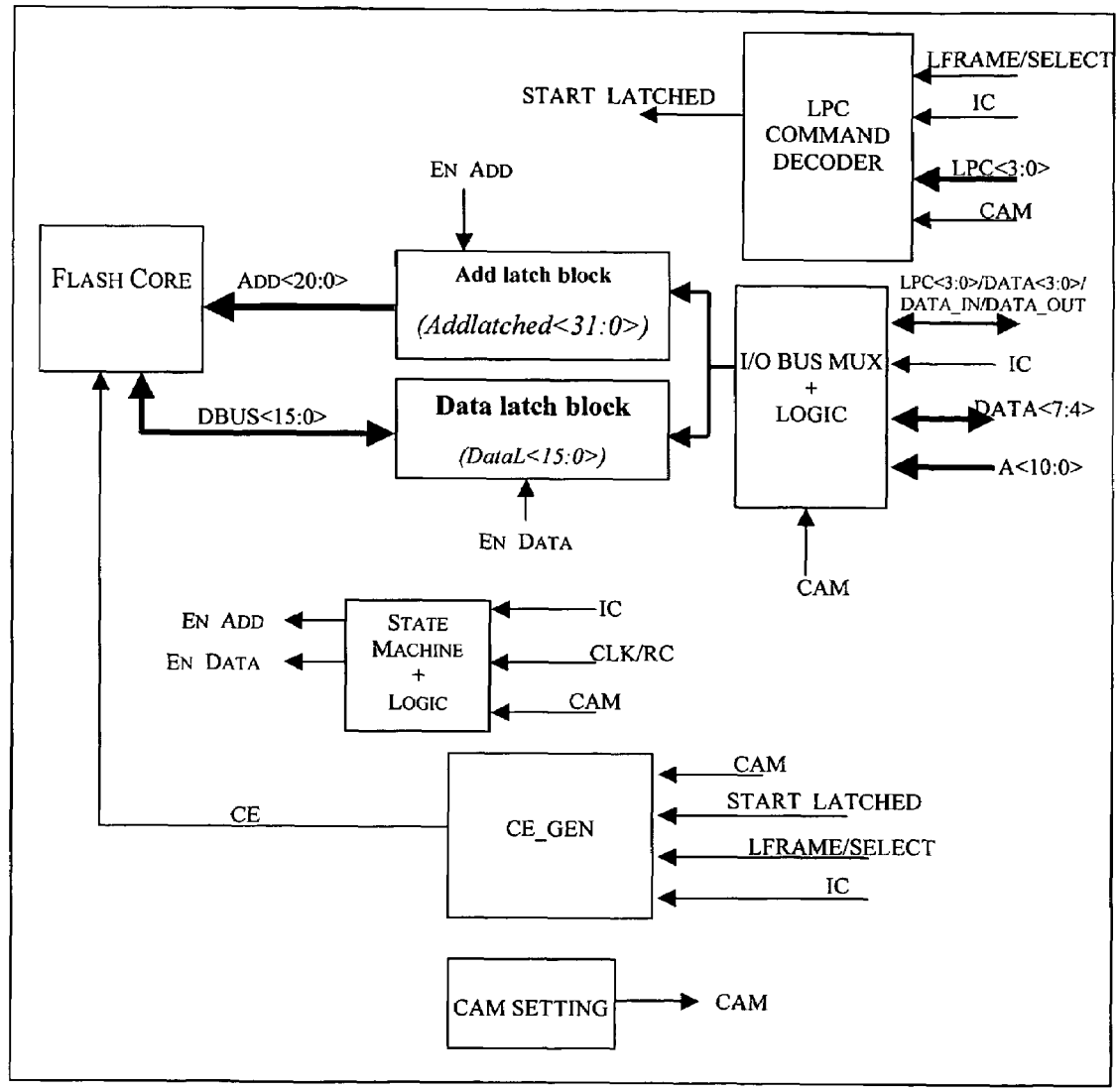
FIG. 8 is a more detailed illustration of the memory device according to the present invention.

According to the invention, it has been found that such a signal may be generated as a logic combination of the signals available on second pin LFRAME/SELECT and on the third pin IC, and of the configuration signal CAM that is internally generated within the device for selecting between the two different serial communication protocols that are supported. To more clearly illustrate the manner in which this is made possible, reference can be made to FIG. 8 showing a more detailed preferred embodiment of the memory device of the invention.

The device includes a standard memory core Flash Core, a configuration circuit CAM_SETTING that generates the logic configuration signal CAM, and a multi-protocol interface composed by the other circuit blocks. A command circuit LPC COMMAND DECODER generates a logic circuit START_LATCHED that becomes active when a start cycle of a serial communication protocol is received, and in consideration of the fact that such a circuit is no longer necessary if the memory core is to be accessed in a parallel mode, it is disabled by the IC signal.

The configuration signal CAM specifies which of the two serial protocols is being utilized, the signal LFRAME/SELECT indicates the start of the protocol and only the four least significative bits of the external data bus LPC<3:0> are used for transmitting data frames. The enable signal CE is generated by a logic circuit CE_GEN which combines the IC, LFRAME/SELECT, START_LATCHED and CAM signals.

According to the method of the invention, the enable signal CE is active when a parallel communication mode is selected (when the signal IC is active), or while in a parallel communication mode of operation when a start signal LFRAME/SELECT of a serial communication protocol is received and the first cycle thereof is correctly recognized immediately after a start cycle of a serial communication protocol.

The standard memory core FLASH CORE may exchange data and/or addresses with the multi-protocol interface through banks of address latches ADDLATCHED<31:0> and data latches DATA<15:0> under the enabling control of a state machine STATE MACHINE, respectively through the enabling signals EN_ADD and EN_DATA. The circuit block I/O_BUS_MUX that forms the core of the multi-protocol interface is coupled to the external buses, and exchanges through the external buses data and addresses of the standard memory core of the device.

Figure 9:
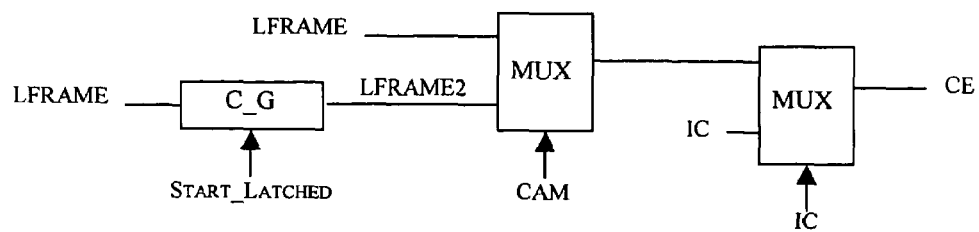
FIG. 9 shows a preferred embodiment of the logic circuit that generates the enable signal according to the present invention.

FIG. 9 shows a preferred embodiment of the logic circuit CE_GEN. The logic circuit CE_GEN is basically formed by a circuit C_G generating a signal LFRAME2 that is obtained as a logic combination of the signals LFRAME and START_LATCHED, and by a pair of multiplexers MUX connected in cascade and controlled by the signal CAM and IC, respectfully.

When the parallel communication mode A/AMUX is selected, the enable signal CE coincides with the selection signal IC. Conversely, when the memory is to be accessed in a serial mode, the signal IC takes the low logic value and the enable signal CE coincides with the output of the first multiplexer of the pair in cascade. This first multiplexer selects either the signal LFRAME or the signal LFRAME2 depending on whether the configuration signal CAM identifies either a Firmware Hub protocol (or other LPC protocol) or a SPI protocol.

Figure 10:
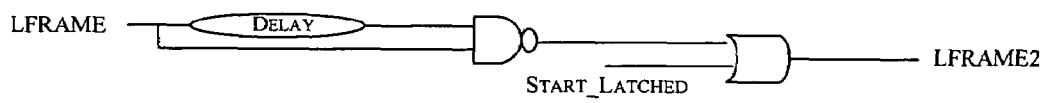
FIG. 10 shows a preferred embodiment of the circuit of FIG. 9.

A preferred embodiment of the C_G circuit is shown in FIG. 10. Accordingly, the signal LFRAME2 is active if the signal START_LATCHED is active, or if it is active a delayed and inverted replica of the start signal LFRAME. It is preferable that the signal LFRAME2 be generated in this way to avoid, because of internal propagation delays, the signal START_LATCHED becomes active after the output of the NAND gate has taken a logic null value, which would cause a spurious switching of the enable signal CE.

Figure 1:
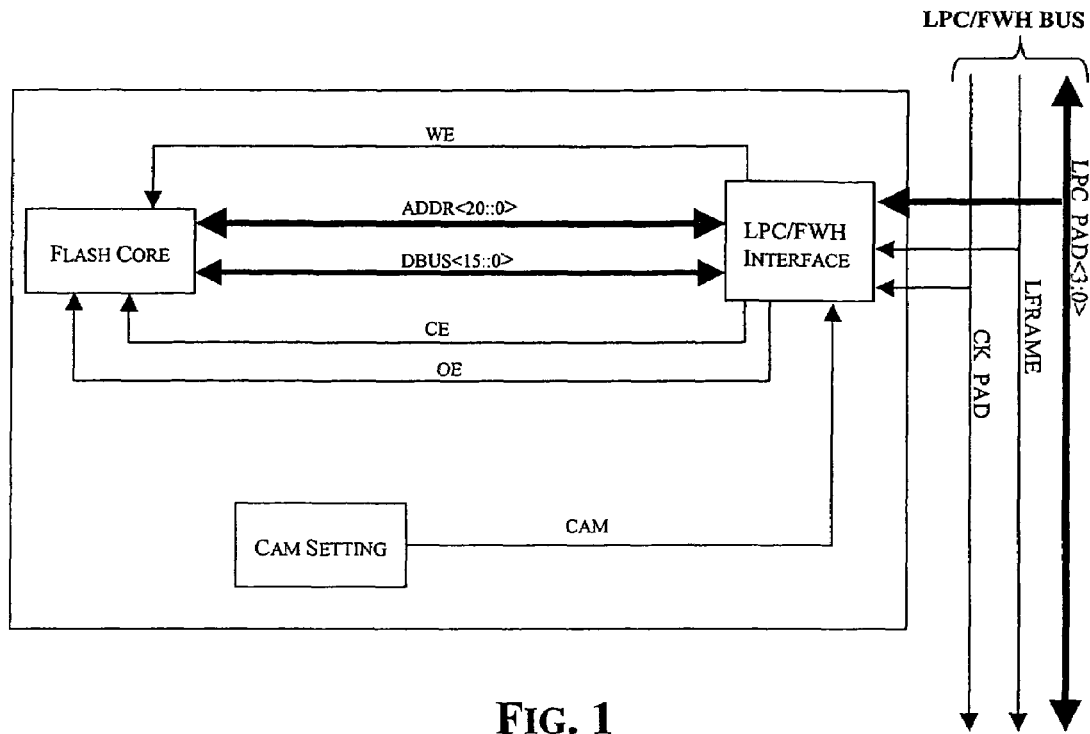
FIG. 1 shows a common memory device for implementing a Firmware Hub protocol or other LPC protocol according to the prior art.
Figure 2:
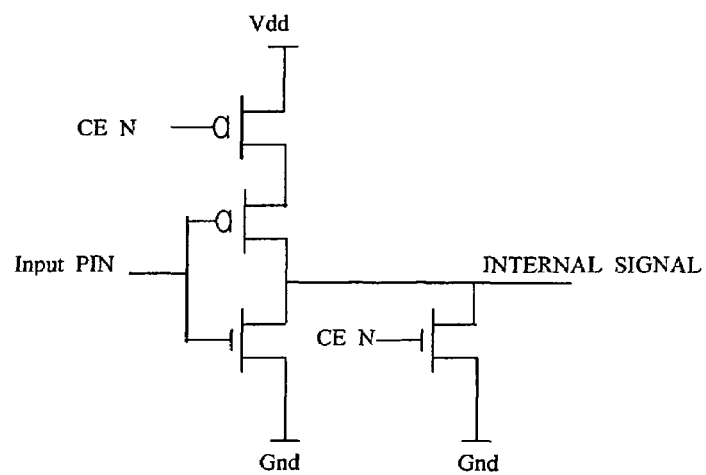
FIG. 2 shows an input buffer commonly used in the memory device of FIG. 1.
Figure 3:
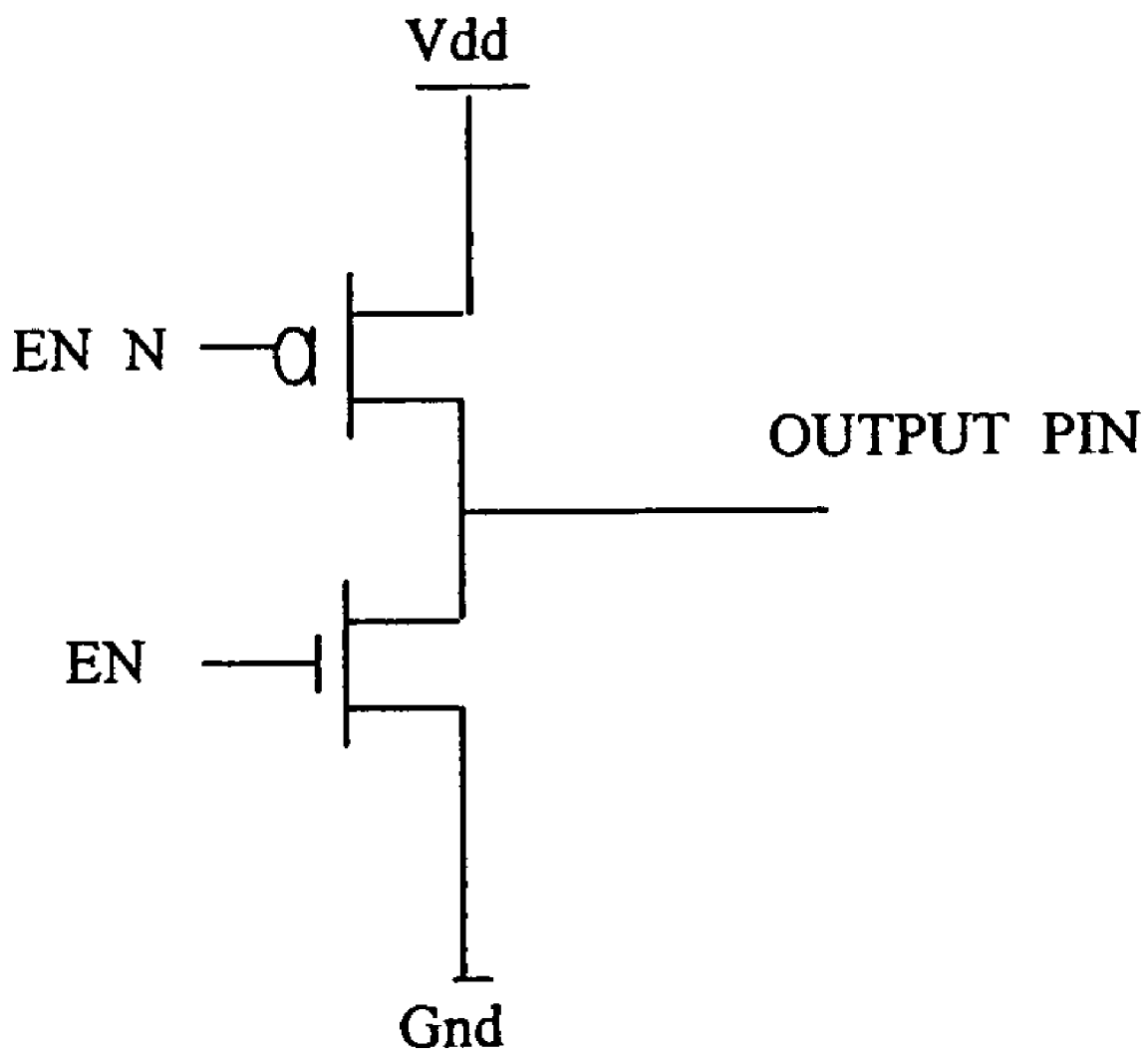
FIG. 3 shows a typical output buffer used in the common memory device of FIG. 1.
Figure 4:
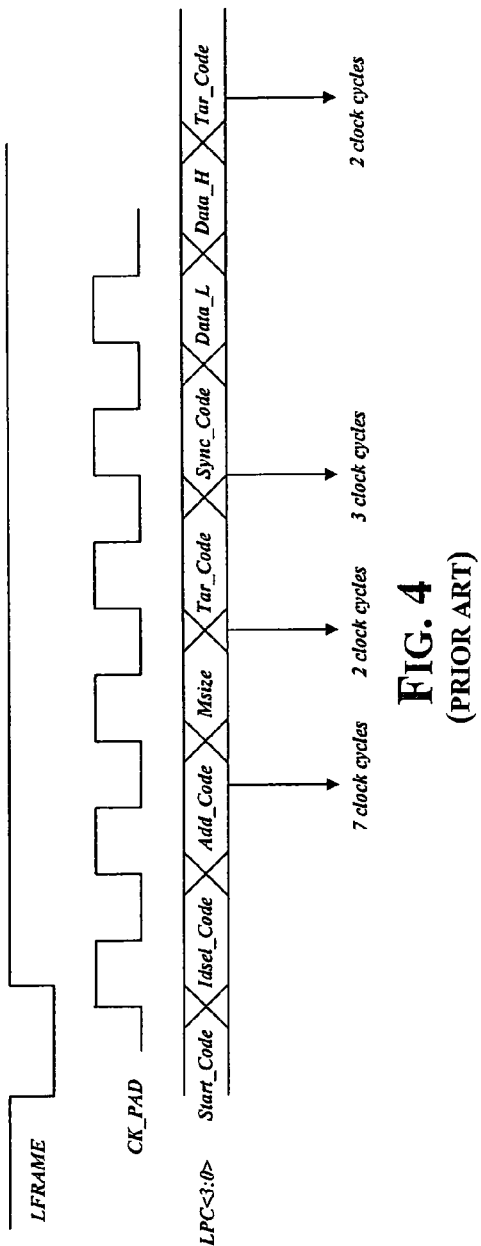
FIG. 4 shows the cycle of the Firmware Hub protocol for carrying out a read operation in a serial mode according to the prior art.
Figure 5:
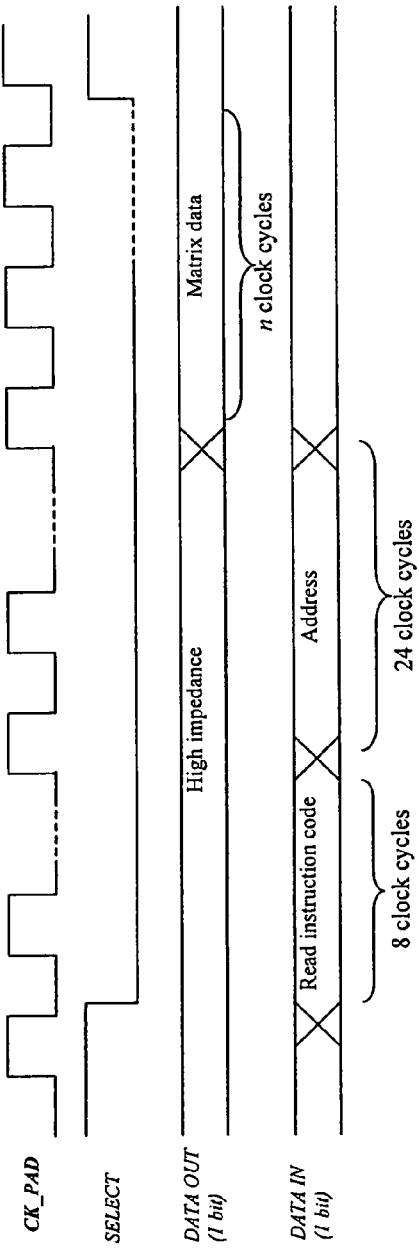
FIG. 5 shows the cycles of an SPI protocol for carrying out a read operation in a serial mode according to the prior art.
Figure 6:
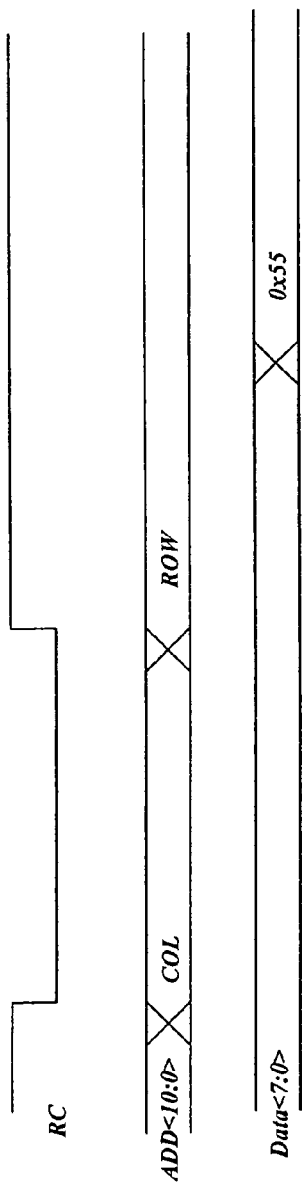
FIG. 6 shows the cycles of a parallel communication A/AMUX protocol for carrying out a read operation according to the prior art.
Figure 11:
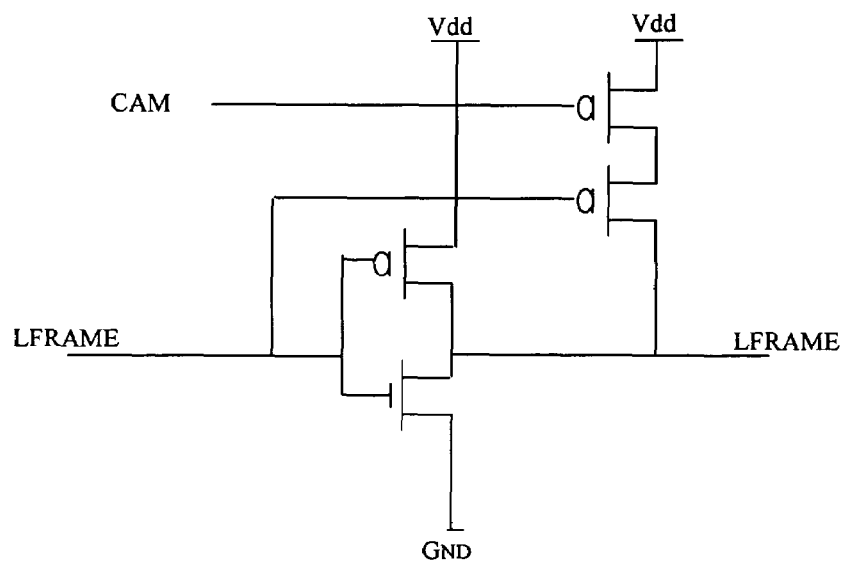
FIG. 11 shows an input buffer of the memory device according to the present invention.

Finally, assuming that the memory device is to function with a PCI bus implementing an LPC protocol, as well as with a SPI bus with a single input bit and a single output bit, input buffers that are compatible with a SPI bus are to be used, for example of the type shown in FIG. 11, rather than common input buffers as the one shown in FIG. 2.

That which is claimed is:

1. A method comprising:
   receiving, at a first circuit of a memory device, a logic configuration signal generated at a second circuit of the memory device, the logic configuration signal configured to indicate a selection of a serial communication protocol from a plurality of serial communication protocols;
   receiving, at the first circuit, a logic selection signal from a first pin of the memory device, the logic selection signal configured to indicate a selection of a parallel communication protocol;
   receiving, at the first circuit, a first start signal from a second pin of the memory device, the first start signal configured to indicate a start of a selected communication protocol;
   receiving, at the first circuit, a second start signal generated at a third circuit of the memory device, the second start signal configured to indicate receipt of a start cycle of a selected serial communication protocol;
   generating, at the first circuit, an enable signal based at least in part on the logic configuration signal, the logic selection signal, the first start signal, and the second start signal; and
   providing the enable signal to a memory core of the memory device to enable a transfer operation.

2. The method of claim 1, wherein the logic selection signal is configured to indicate a selection of a parallel communication protocol when asserted, the method further comprising:
   receiving, via a third pin of the memory device, an address multiplexing signal when the logic selection signal is asserted; and
   receiving, via the third pin, a timing signal when the logic selection signal is not asserted.

3. The method of claim 1, wherein the logic selection signal is configured to indicate a selection of a parallel communication protocol when asserted, the method further comprising:
   receiving, at a multi-protocol interface of the memory device when the logic selection signal is asserted, data from a data bus coupled to the memory device and memory addresses from an address bus coupled to the memory device; and
   receiving, at the multi-protocol interface when the logic selection signal is not asserted, data from a subset of the data bus.

4. The method of claim 1, wherein the logic selection signal is configured to indicate a selection of a parallel communication protocol when asserted and said generating the enable signal comprises:
   determining that the logic selection signal is asserted; and
   generating the enable signal as a replica of the logic selection signal based at least in part on said determining.

5. The method of claim 1, wherein the logic selection signal is configured to indicate a selection of a parallel communication protocol when asserted and said generating the enable signal comprises:
  determining that the logic selection signal is not asserted; and
  generating the enable signal as a replica of either the first start signal or a replica of a logical combination of the first start signal and the second start signal.

6. An apparatus comprising:
  a memory core;
  a first circuit to generate a logic configuration signal to indicate a selection of a serial communication protocol from a plurality of serial communication protocols;
  a first pin to receive a logic selection signal configured to indicate a selection of a parallel communication protocol;
  a second pin to receive a first start signal configured to indicate a start of a selected communication protocol;
  a second circuit to generate a second start signal configured to indicate receipt of a start cycle of a selected serial communication protocol; and
  a third circuit to generate an enable signal based at least in part on the logic configuration signal, the logic selection signal, the first start signal, and the second start signal and to provide the enable signal to the memory core to enable a transfer operation.

7. The apparatus of claim 6, wherein the logic selection signal is configured to indicate a selection of a parallel communication protocol when asserted and the apparatus further comprises:
  a third pin to receive a signal; and
  a multi-protocol interface including the second circuit and the third circuit and coupled to the first pin, the second pin, and the third pin, the multi-protocol interface to interpret the signal as an address multiplexing signal when the logic selection signal is asserted and as a timing signal when the logic selection signal is not asserted.

8. The apparatus of claim 7, wherein the multi-protocol interface is further coupled to an external data bus and an external address bus and configured to:
  receive data from the external data bus and memory addresses from the external address bus when the logic selection signal is asserted; and
  receive data from a subset of the external data bus when the logic selection signal is not asserted.

9. The apparatus of claim 6, wherein the logic selection signal is configured to indicate a selection of a parallel communication protocol when asserted and the third circuit is further configured to:
  determine that the logic selection signal is asserted; and
  generate the enable signal as a replica of the logic selection signal based at least in part on said determining.

10. The apparatus of claim 6, wherein the logic selection signal is configured to indicate a selection of a parallel communication protocol when asserted and the third circuit is further configured to:
  determine that the logic selection signal is not asserted; and
  generate the enable signal as a replica of either the first start signal or a replica of a logical combination of the first start signal and the second start signal.

11. The apparatus of claim 6, further comprising:
  an internal data bus coupled to the memory core;
  an internal address bus coupled to the memory core; and
  a multi-protocol interface, including the second circuit and the third circuit, and configured to transfer data between the internal data bus and an external data bus according to a selected communication protocol.

12. The apparatus of claim 11, further comprising:
  a third pin to receive a signal interpreted by the multi-protocol interface as a timing signal or an address multiplexing signal;
  an address latch block coupled to the internal address bus;
  a data latch block coupled to the internal data bus; and
  the multi-protocol interface having a fourth circuit to generate an enable address signal for the internal address bus and an enable data signal for the internal data bus based at least in part on the logic configuration signal, the logic selection signal, the first start signal, and the signal from the third pin.

13. The apparatus of claim 6, wherein the second circuit is to generate the second start signal based at least in part on the logic configuration signal, the logic selection signal, the first start signal, and least significant bits of an external data bus.

14. The apparatus of claim 6, wherein the first circuit is permanently configured to indicate a selection of the serial communication protocol.

15. The apparatus of claim 6, wherein the third circuit comprises:
  a sub-circuit to generate a third start signal based at least in part on the first and second start signals;
  a cascaded multiplexor arrangement to provide the first start signal, the third start signal, or the logic selection signal as the enable signal based at least in part on the logic selection signal and the logic configuration signal.

16. The apparatus of claim 15, wherein the sub-circuit comprises:
  a NAND gate having a first input to receive the first start signal and a second input to receive an edge delayed replica of the first start signal; and
  an OR gate coupled to the NAND gate and having a first input to receive a signal from the NAND gate, and a second input to receive the second start signal, and an output to provide the third start signal.

* * * * *